(12) United States Patent
Ory

(10) Patent No.: US 8,376,395 B2
(45) Date of Patent: Feb. 19, 2013

(54) AIRBAG FLAP ARRANGEMENT HINGED ON A DASHBOARD

(75) Inventor: Daniel Ory, Le-Plessis-Bouchard (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/145,522

(22) PCT Filed: Jan. 20, 2010

(86) PCT No.: PCT/EP2010/050614
§ 371 (c)(1),
(2), (4) Date: Sep. 24, 2011

(87) PCT Pub. No.: WO2010/084123
PCT Pub. Date: Jul. 29, 2010

(65) Prior Publication Data
US 2012/0280476 A1    Nov. 8, 2012

(30) Foreign Application Priority Data
Jan. 21, 2009  (FR) ...................................... 09 00252

(51) Int. Cl.
*B60R 21/216* (2011.01)
(52) U.S. Cl. .................................. 280/728.3; 280/743.2
(58) Field of Classification Search ............... 280/728.3, 280/743.4, 732
See application file for complete search history.

(56) References Cited

U.S. PATENT DOCUMENTS

| | | | | |
|---|---|---|---|---|
| 5,472,228 A * | 12/1995 | Bentley et al. | ............. | 280/728.3 |
| 5,902,428 A * | 5/1999 | Gallagher et al. | ........... | 156/73.1 |
| 5,941,558 A * | 8/1999 | Labrie et al. | ............... | 280/728.3 |
| 5,975,563 A * | 11/1999 | Gallagher et al. | ......... | 280/728.3 |
| 6,338,501 B1 | 1/2002 | Heilig et al. | | |
| 2007/0080521 A1* | 4/2007 | Leserre et al. | ............. | 280/728.3 |
| 2011/0181028 A1* | 7/2011 | Brunet | ........................ | 280/728.3 |
| 2011/0278827 A1* | 11/2011 | Laboeck et al. | ........... | 280/743.2 |

FOREIGN PATENT DOCUMENTS

| | | |
|---|---|---|
| DE | 10325932 | 1/2005 |
| EP | 0872389 | 10/1998 |
| JP | 08192706 | 7/1996 |

OTHER PUBLICATIONS

International Search Report for PCT/EP2010/050614 dated Feb. 23, 2010, 2 pages.

\* cited by examiner

*Primary Examiner* — Drew Brown
(74) *Attorney, Agent, or Firm* — Reising Ethington P.C.

(57) ABSTRACT

The invention relates to an airbag flap arrangement hinged to a dashboard provided with an opening closed by a flap (4), both the opening and the flap being defined by an outline (3), the flap being suitable for opening so as to allow an airbag to be deployed. The arrangement is provided with one or more linear ties (11-14) fastened to one face of the dashboard body and to one face of the flap, in such manner that at least two linear tie segments straddle a lateral portion (8, 9) of the outline (3). The two linear tie segments are slack and cross over each other at the lateral portion of the outline that they straddle so as to constitute means for limiting the amplitude of opening of the flap. The invention relates to motor vehicle safety.

10 Claims, 2 Drawing Sheets

AIRBAG FLAP ARRANGEMENT HINGED ON A DASHBOARD

The invention relates to a flap equipping an opening in a dashboard body of a motor vehicle, which flap masks an airbag carried at the back face of said dashboard.

BACKGROUND OF THE INVENTION

In such an arrangement, the dashboard, which is situated inside the vehicle and below the windscreen, comprises a dashboard body that has a back face carrying an airbag module, which module comprises an enclosure containing the airbag and inflation means for inflating said airbag, and facing the corresponding opening in the dashboard body.

The opening, which is generally rectangular, is closed by one or two flaps, each of which has an edge that is hinged to a corresponding transverse edge of said opening. A firing channel, forming a spacer, is interposed between the airbag module and the back face of the dashboard body.

The front face of each flap and the front face of the dashboard body constitute a substantially continuous convex surface. Said convex surface may be covered by a skin, in order to make the flap substantially invisible to an occupant of the vehicle.

When an impact is detected, the airbag inflates automatically, so that it exerts pressure on the inside face of the flap, thereby causing it to open, against the covering that tears. That enables the airbag to be deployed through the dashboard towards the inside of the vehicle, in such a manner as to be interposed between an occupant of the vehicle and the dashboard.

The flap opens and the airbag is fully inflated within a lapse of time that must be sufficiently short to protect the occupant of the vehicle by preventing the occupant's head from hitting the dashboard or the windscreen under the effect of the impact.

The airbag inflating thus causes the flap to open, also very rapidly, so that the free edge of said flap is actually stopped by the windscreen that it generally hits, thereby causing the opening movement of the flap to cease.

In practice, it can happen that the impact of the flap against the windscreen breaks the windscreen, and naturally that is undesirable in view of the fragments of glass that could injure the occupant of the vehicle, and in view of the repair cost that is increased by the need to replace the windscreen.

In order to avoid destroying the windscreen, consideration has been given to closing the opening in the dashboard body by means of two rectangular flaps, one opening upwards and the other downwards. The flap opening upwards is then of smaller size so that its opening movement is stopped by the dashboard itself, rather than by the windscreen.

Unfortunately, implementing two rectangular flaps constitutes a solution that is complex in terms of production, which increases the overall cost.

Alternatively, the opening is closed by a single flap made of a material that is sufficiently flexible to reduce the risk of the windscreen breaking, but that solution remains difficult to implement. It is necessary to reconcile two contradictory requirements: the flap must be sufficiently flexible not to break the windscreen, but it must also be stiff enough not to deform when it is closed, so that the dashboard continues to have its original curve.

In addition, since the flap continues to be stopped by the windscreen, even if said flap is flexible, the opening energy continues to be fully transferred to the windscreen, so that it cannot be totally guaranteed that it will not break.

Consideration has also been given to equipping the flap with ties, each of which connects one of its edges to the dashboard body so as to restrict its movement in order to limit the extent to which it can open. However, the presence of lateral ties reduces the area through which the airbag is deployed, it then no longer being possible for the airbag to be deployed laterally in satisfactory manner. In addition, the forces involved during the deployment are such that those ties are torn off or else brake the deployment of the airbag if they are strong enough.

It must be possible for the airbag to be deployed effectively both in the frontal direction and also in the lateral directions so as to enable an occupant seated in a non-conventional position on the seat to be protected reliably.

OBJECT OF THE INVENTION

An object of the invention is to propose a solution for remedying the above drawbacks.

SUMMARY OF THE INVENTION

To this end, the invention provides a motor vehicle dashboard body provided with an opening closed by a flap, both the opening and the flap being defined by an outline that is generally rectangular, the flap being suitable for opening so as to allow an airbag to be deployed, said motor vehicle dashboard body being characterized in that it is further provided with one or more linear ties fastened to one face of the dashboard body and to one face of the flap, in such manner that at least two linear tie segments straddle a lateral portion of the outline that extends longitudinally relative to the vehicle on which the dashboard is to be mounted, said two linear tie segments being slack and crossing over each other at the lateral portion of the outline that they straddle so as to constitute means for limiting the amplitude of opening of the flap.

Disposing the linear ties in a crossed-over configuration makes it possible to increase the area through which the airbag passes in order to be deployed, so that said area extends to the levels of the lateral portions of the flap, in order to enable the airbag to be deployed laterally. In addition, by means of their crossed-over configuration the segments of ties on the same side have lengths that are close to each other so that they have substantially the same mechanical behavior in terms of elasticity and of breaking strength.

The invention also provides a dashboard body as defined above, provided with a linear tie segment that is fastened to the flap in a zone separated from a free edge of the flap by a distance lying in the range zero to 40% of the length of the flap, and with another linear tie segment that is fastened to the flap in a zone separated from the free edge of the flap by a distance lying in the range 45% of the length of the flap to 75% of said length of the flap.

The invention also provides a dashboard body as defined above, provided with a linear tie segment fastened to the dashboard body in a zone separated from a portion of the outline that coincides with the hinge via which the flap is hinged to the body by a distance lying in the range 25% of the length of the flap to 50% of said length, and provided with another tie segment that is fastened to the dashboard body in a zone separated from the portion of the outline by a distance lying in the range 60% of the length of the flap to 100% of said length of the flap.

The invention also provides a dashboard body as defined above, wherein the dashboard body is provided with a back reinforcement to which the linear tie segments are fastened, and wherein said reinforcement has a thickness lying in the range 15% of the length of the flap to 25% of said length of the flap.

The invention also provides a dashboard body as defined above, provided with fastening tabs overmolded on the linear ties, the linear ties being fastened to the body of the dashboard and/or to the flap via said tabs.

The fastening tabs make it possible to optimize the quality of the securing of each linear tie to the dashboard body and to the flap, this fastening being achieved, for example, by ultrasound or vibration welding.

The invention also provides a dashboard body as defined above, provided with at least one linear tie fastened to the dashboard body or to the flap by means of two tabs overmolded on said linear tie, said two tabs being mutually superposed and fastened to each other, one of said tabs being fastened to the dashboard body or to the flap.

Superposing a plurality of tabs makes it possible to improve further the cohesion between the linear ties and the dashboard body and/or the flap.

The invention also provides a dashboard body as defined above, provided with a single linear tie arranged so as to include firstly at least two segments, each of which straddles a lateral portion of the outline so as to retain the flap while it is opening, and secondly segments, each of which straddles the transverse portion of the outline so as to constitute or reinforce a hinge via which the flap is hinged to the dashboard body.

With this solution, the same technology is used to constitute the hinge of the flap and the retaining means thereof, thereby making it possible to limit the overall manufacturing cost significantly.

The invention also provides a dashboard body as defined above, wherein the flap is provided with a trough in which each linear tie is engaged, and wherein one or more ribs extending perpendicularly to the linear tie are provided so as to avoid the flap being torn by the tie during opening.

The invention also provides a dashboard body as defined above, wherein the ties are made of a material including polyaramide fiber and/or polyester fiber.

The invention also provides a dashboard body as defined above, wherein the ties have breaking strength greater than 150 decanewtons (daN), and wherein said ties have breaking elongation less than 25%.

DETAILED DESCRIPTION OF THE INVENTION

Figure 1:
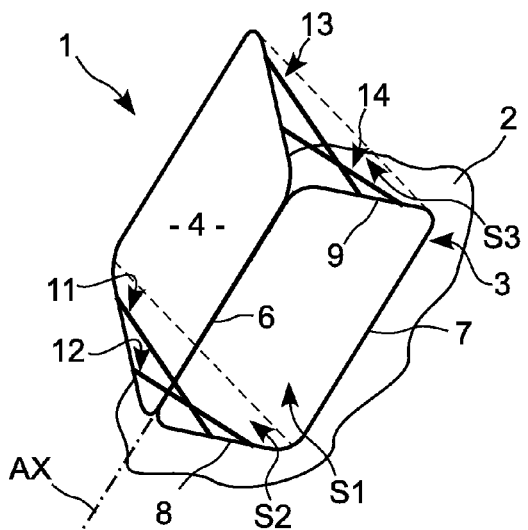
FIG. 1 is a diagrammatic perspective view of a first embodiment of the invention, showing the flap open with two crossed-over retaining linear ties situated on either side of said flap.
Figure 2:
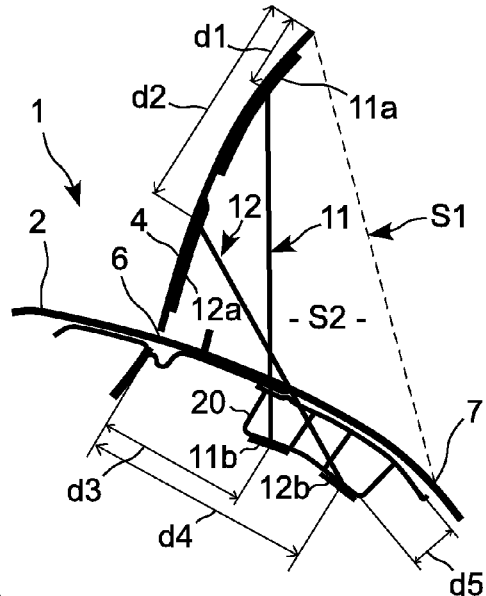
FIG. 2 is a section view of the first embodiment of the invention, showing the flap open, with two crossed-over linear ties.

In FIGS. 1 and 2, a dashboard designated by the overall reference 1 has a dashboard body 2 that is provided with an opening defined by a generally rectangular outline 3 and through which an airbag (not shown) can pass, which opening is closed by a flap referenced 4.

The rectangular outline 3 has two transverse portions 6 and 7, corresponding to opposite sides extending transversely relative to the direction of advance of the vehicle on which the dashboard 1 is to be mounted. This outline has two lateral other portions 8 and 9, corresponding to its other opposite sides extending longitudinally relative to the direction of advance of the vehicle.

The flap 4 is designed to open when the airbag (not shown) is deployed, by pivoting about a transverse axis AX coinciding with the transverse portion 6 of the outline 3.

The portions 7, 8, 9 of the outline 3 that correspond respectively to the free edge of the flap 4 and to its lateral edges, are scored cutouts or full cutouts passing through some or all of the thickness of the dashboard. The portion 6 coinciding with the hinge AX about which the flap pivots may also be in the form of a scored cutout, of a cutout, or else of a reduction in thickness of the body of the dashboard.

The flap 4 may thus either be a part that is completely distinct from the remainder of the body of the dashboard or, conversely, it may be made integrally of the same material as the remainder of the dashboard body. In which case, the flap is merely defined by the outline 3.

The cutouts or scored cutouts constituting the outline 3 may be obtained using cutting tools or other tools and/or result from the operation of molding the dashboard body.

As can be seen in the figures, the arrangement has two pairs of tie segments, each tie segment having one end fastened to the back face of the body 2 and one end fastened to the back face of the flap 4, these pairs of tie segments comprising the tie segments 11 & 12 and the tie segments 13 & 14.

During manufacture and/or assembly, each of the tie segments 11 and 12 has one end fastened to the back face of the body 2 and another end fastened to the back face of the flap 4 in such manner as to be slack and to cross over each other at the lateral portion 8 of the outline 3. In analogous manner, the tie segments 13 and 14 have their ends fastened to the back face of the body and to the back face of the flap, while being slack and crossing over each other at the lateral portion 9 of the outline 3.

As can be seen in FIGS. 1 and 2, these linear tie segments constitute means for limiting opening of the flap 4 during deployment of the airbag, in such manner as to ensure that the flap does not hit the windscreen. The crossed-over configuration of the tie segments makes it possible to extend the area through which the airbag passes in order to deploy, so as to allow it to deploy laterally in appropriate manner while also limiting deformation of the flap and the forces in each tie.

This area has a rectangular frontal portion S1 defined firstly by the free edge of the flap 4 and by the transverse portion 7 of the outline 3. By means of the crossed-over configuration of the tie segments, the rectangular frontal portion S1 is extended laterally by two additional portions S2 and S3. Each additional portion is defined by a lateral edge of the flap 4 and by a corresponding lateral portion of the outline 3, and by two crossed-over tie segments, and by an imaginary link shown in dashed lines and connecting a corner of the flap to a corresponding corner of the rectangular outline.

By means of their crossed-over configuration, these tie segments also have lengths that are substantially identical, thereby facilitating their dimensioning, because they can thus have the same composition and the same section, while also having mechanical qualities that are close to each other in terms of elasticity and/or of breaking strength and of energy absorption, due to their substantially identical lengths.

As shown in FIG. 2, the linear tie segment 11 is fastened to the flap 4 while being situated at a distance d1 from the free edge of said flap, and the linear tie segment 12 is fastened to the flap 4 while being situated at a distance d2 from said flap.

The distances d1 and d2 are chosen to impart substantially the same length to both of the tie segments 11 and 12, and also to impart substantially the same length to both of the tie segments 13 and 14, the distance d1 lying in the range zero to 40% of the length of the flap between its free edge and the portion 6, and preferably in the range 5% to 20% of said length.

The distance d2 lies in the range 45% to 75% of said length, and preferably in the range 55% to 65% of said length.

At the dashboard body per se, the tie segments 11 and 12 have their ends spaced apart from each other along the portion 8, and, in analogous manner, the tie segments 13 and 14 have their ends spaced apart from each other along the portion 9 of the outline 3.

As shown more particularly in FIG. 2, and as indicated above, each tie segment has an end fastened to the back face of the flap 4, and another end fastened to the back face of the dashboard body 2 at a back reinforcement referenced 20.

The back face of the dashboard that includes the reinforcement 20 is the face that faces towards the ground and towards the front of the vehicle, as opposed to its outside or front face that faces upwards and towards the occupants of the vehicle.

This reinforcement may be distinct and mounted on the back face of the dashboard body 2 or it may be directly integrated into said back face, and said reinforcement may optionally constitute the firing channel for firing the airbag. It has a thickness d5 lying in the range zero to 40% of the length of the opening, and preferably lying in the range 15% to 25% of said length.

The linear tie segment 11 is fastened to the reinforcement 20 while being situated at a distance d3 from the portion 6 of the outline 3, about which the flap pivots, and the linear tie segment 12 is fastened to the reinforcement 20 while being situated at a distance d4 from said portion 6.

The distances d3 and d4 are chosen to impart substantially the same length to both of the tie segments 11 and 12, and also to impart substantially the same length to both of the tie segments 13 and 14. The distance d3 lies in the range 25% to 50% of the length of the flap, and preferably in the range 35% to 40% of said length.

The distance d4 lies in the range 60% to 100% of the length of said flap, and preferably in the range 75% to 90% of said length.

In addition, in practice, the difference in length between the tie segments 11 and 12 or 13 and 14 is less than 45 millimeters (mm), or indeed less than 30 mm, and preferably less than 20 mm.

As shown in FIG. 2, each linear tie segment 11 and 12 is provided with two tabs 11a & 11b, 12a & 12b overmolded at respective ones of its ends, and via which it is fastened firstly to the body of the dashboard 2 and secondly to the flap 4. The same applies to the tie segments 13 and 14.

Figure 3:
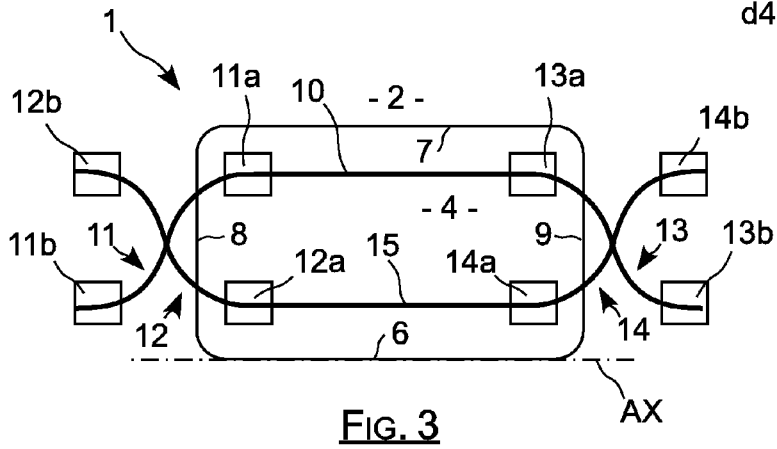
FIG. 3 is a back view of the first embodiment of the invention when the flap is closed.

As shown in FIG. 3, the tie segments 11 and 13 may be part of a single tie 10, and the tie segments 12 and 14 are parts of a single other tie referenced 15. Each of the ties 10 and 15 thus extends over the back face of the flap to which it is fastened while extending beyond said flap on either side towards the dashboard. Alternatively, the tie segments 11 to 14 may also correspond to four distinct ties.

Each of the fastening tabs of the ties or tie segments has a generally flat and rectangular-block shape. They constitute fastening plates that are made of a material such as a plastics material that can be fastened securely to the body of the dashboard 2 and to the flap 4, e.g. by ultrasound welding, by adhesive bonding, or by some other technique.

When the flap is opened, the pressing forces exerted by the airbag on the back face of the flap 4 cause said flap to be opened, possibly by tearing portions of the outline 3 when said outline is a scored cutout.

Figure 4:
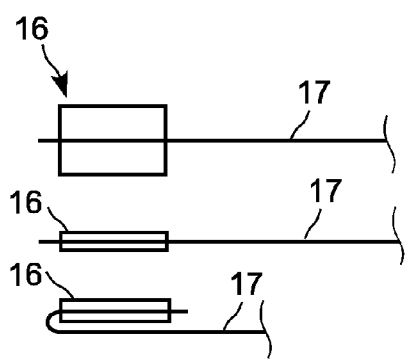
FIG. 4 is a side view of an example of a tab overmolded at one end of a linear tie for fastening it to the flap or to the body of the dashboard.

During such opening, the linear ties 11 and 12 limit the extent to which the flap opens in such manner as to ensure it does not hit the windscreen. In order to ensure that there is no risk of the forces to which the linear ties 11-14 are subjected causing the ties to slip in the tabs, and thereby resulting in the ends of said linear ties being disunited during opening, particular arrangements may be provided for said tabs, as shown in FIGS. 3 and 4.

When a single tab 16 is overmolded at the end of a linear tie 17, said tab 16 firstly has a face fastened directly to a face of the dashboard body or to a face of the flap, and the linear tie 17 is then folded over onto the free face of said tab 16 in such manner as to obtain a wedging effect opposing slippage of the tie inside the tab. Additionally, the tie 17 may also be fastened to the outside face of the tab, as shown in FIG. 4.

The robustness of the fastening of the linear tie 17 is thus increased because the fastening of the linear tie 17 to the tab 16 that is itself secured to its support is achieved firstly by the tab 16 being overmolded on the linear tie, and secondly by the linear tie being fastened to the free face of said tab 16. The linear tie 17 thus extends through the thickness of the tab 16, while also being fastened to the free face thereof.

Figure 5:
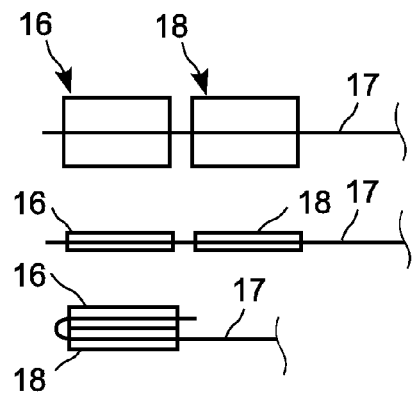
FIG. 5 is a side view of another example in which two tabs are overmolded at the same end of a linear tie for fastening it to the flap or to the dashboard body.

Additionally, another tab 18 may also be overmolded on the same linear tie 17, while being spaced apart to a small extent from the tab 16 along said tie, as shown in FIG. 5, it being possible for these two tabs to be interconnected via a hinge-forming film. In this situation, during assembly, the first tab 16 is folded over and fastened to a face of the second tab 18, and the other face of the tab is then fastened directly to a face of the dashboard body or to a face of the flap.

The tabs are fastened to the back face of the flap and to the back face of the dashboard body by ultrasound welding, or by any other method adapted to plastics materials and used for such tabs, for the flap and for the dashboard body.

Alternatively, and as a function of the materials used, the linear ties may be fastened directly to the back faces of the flap and of the dashboard body.

The linear ties that are fastened to the back face of the dashboard body and to the back face of the flap have crossed-over segments over each lateral edge 8, 9 of the outline 3. But these linear ties may also extend beyond this region so as to straddle the transverse edge 6 coinciding with the pivot axis AX of the flap 4, in such manner as also to reinforce or indeed to constitute the hinge via which the flap 4 is hinged to the remainder of the dashboard 2.

Figure 6:
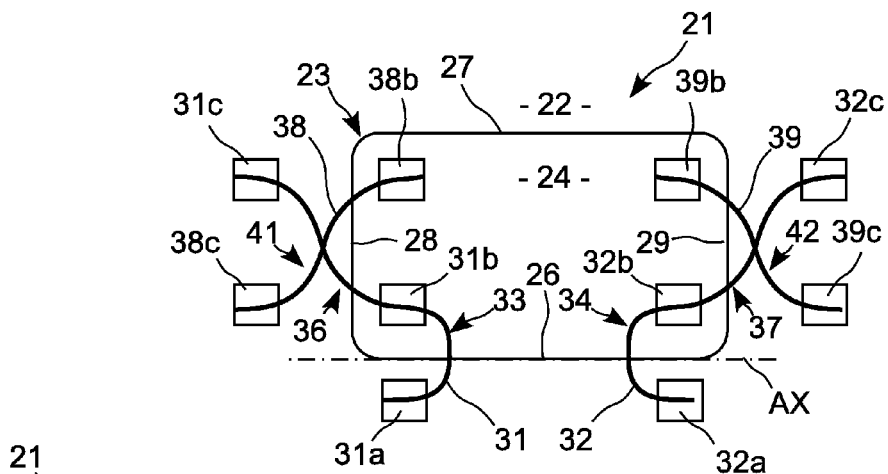
FIG. 6 is a back view of a second embodiment of the invention, in which embodiment four linear ties are fastened directly to the back face of the flap and to the back face of the dashboard body via overmolded tabs so as to constitute both means for retaining said flap and also the hinge of the flap.

In the example shown in FIG. 6, as in the preceding example, the dashboard 21 has a body 22 provided with an outline 23 defining an opening closed by a flap 34. In this example too, the outline 23 is generally rectangular and has two opposite transverse portions 26 and 27, one of which, namely the portion 26 coincides with a pivot axis AX of the flap, and two lateral other portions 28 and 29 extending longitudinally relative to the vehicle on which the dashboard is to be mounted.

In this embodiment, each one of two linear ties 31 and 32 has a segment 33, 34 straddling the transverse portion 26 of the outline 23 so as to be fastened on either side of this outline portion. The linear tie 31 is fastened via two tabs 31a and 31b overmolded on said linear tie and that are themselves fastened to the flap 24 and to the dashboard body 22. In analogous manner, the linear tie 32 is fastened to the dashboard body and to the flap respectively via a tab 32a and via another tab 32b, both of which are overmolded on said tie.

The portions 33 and 34 that are tensioned rather than being slack thus make it possible to reinforce or to constitute the hinge via which the flap is hinged to the remainder of the dashboard body.

Additionally, each linear tie 31, 32 extends beyond the tab 31b, 32b fastened to the flap so as to reach the dashboard body 22 again by straddling a corresponding lateral portion 28, 29 of the outline 23. Each of these two linear ties 31, 32 thus has a segment 36, 37 straddling a corresponding lateral portion 28, 29 of the outline 23, and each of said two linear ties is fastened to the dashboard 22 via an additional tab 31c, 32c.

The segment 36, 37 straddling the corresponding lateral portion 28, 29 of the outline is thus fastened on either side of the outline, firstly via the tabs 31b fastened to the flap and secondly via the tabs 31c and 32c fastened to the dashboard.

Two other linear ties 38 and 39 extend from the flap to the body of the dashboard, each of which has a segment 41, 42 straddling a respective one of the lateral portions 28 and 29 and fastened on either side of the corresponding one said lateral portion 28, 29 via overmolded tabs bearing respective ones of the references 38b, 38c, 39b, and 39c.

As shown in the figures, the tabs 31b, 38b, 31c, 38c are disposed in the corners of a square, and the linear ties 31 and 38 on which said tabs are overmolded interconnect said tabs along the diagonals of said square, so that the segments 36 and 41 of said linear ties cross over each other. In analogous manner, the tabs 32b, 39b, 32c, 39c are also disposed in the corners of a square and they are interconnected via the linear ties 32 and 38 disposed on the diagonals of this square in such manner as to cross over at their segments 37 and 42.

As in the first embodiment shown in FIGS. 1 and 2, the segments of the linear ties that straddle the lateral portions of the outline are slack, so as to enable the flap to move, and, in addition, they are of length adjusted to limit the extent to which the flap can open in order to prevent it from hitting the windscreen.

As in the example shown in FIGS. 1 and 2, the crossed-over configuration of the linear ties for retaining the flap makes it possible to retain the flap without unnecessarily reducing the area through which the airbag passes in order to deploy.

Figure 7:
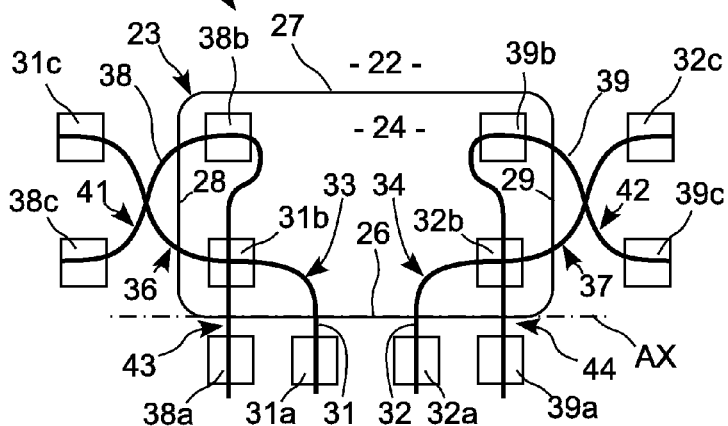
FIG. 7 is a back view of a variant of the second embodiment of the invention, in which embodiment the hinge is made up of four linear ties instead of two.

As shown in the variant in FIG. 7, the additional linear ties 38 and 39 may also extend to the dashboard body so that each of them has a segment 33, 34 straddling the transverse portion 26 of the outline 23 coinciding with the axis AX.

In this variant, the four linear ties 31, 32, and 38, 39 firstly define four segments situated at the hinge AX that they stiffen, and secondly define two crossed-over segments for each lateral edge of the flap, which segments are designed to restrict the opening movement of said flap.

Figure 8:
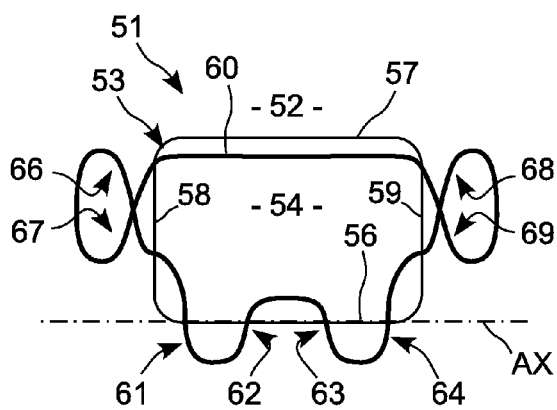
FIG. 8 is a back view of a third embodiment of the invention, in which embodiment a single linear tie is fastened directly to the back face of the flap and to the back face of the dashboard body so as to constitute both the means for retaining the flap, and also the hinge of said flap.

In another embodiment that is shown in FIG. 8, a single linear tie fastened directly to the back face of the flap and to the back face of the dashboard body is arranged in such manner that it includes four segments straddling the portion of the outline of the flap that coincides with the pivot axis thereof, and that each of the two lateral portions of the outline is straddled by two segments crossing over each other and forming retaining linear ties.

In the embodiment shown in FIG. 8, as in the preceding examples, the dashboard 51 has a body 52 provided with an opening defined by an outline 53 and closed by a flap 54. In this embodiment too, the outline 53 is generally rectangular and has two opposite transverse portions 56 and 57, one of which, namely the portion 56, coincides with the pivot axis AX of the flap, and two other lateral portions 58 and 59 that extend longitudinally relative to the vehicle on which the dashboard is to be mounted.

The linear tie that is referenced 60 is disposed at the transverse portion 56 in a series of undulations so as to have four segments 61 to 64 straddling the transverse portion 56 of the outline 53. It is disposed at the lateral portion 58 in such manner as to define two segments 66 and 67 crossing over each other and straddling said lateral portion 58, and it is disposed at the other lateral portion 59 in two other segments 68 and 69 crossing over each other and straddling said other lateral portion 59.

Figure 9:
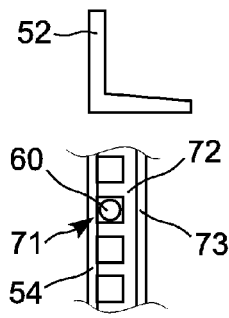
FIG. 9 is a local section view of the flap in the third embodiment of the invention, showing a reinforcement structure for preventing the flap from being torn by the linear tie during opening of the flap.

In order to improve the cohesion of the linear tie with the flap 54 and/or with the dashboard body, the flap 54 may be provided with a reinforcement 72 at its back face, which reinforcement is provided with a trough 71. In which case, as shown in FIG. 9, the linear tie 60 is engaged in the trough 71 to which it can be fastened by ultrasound welding or by some other technique. Additionally, the reinforcement may be provided with external ribs 73 extending perpendicularly to the direction of the tie so as to avoid the reinforcement being torn by the linear tie under the effect of the pressure exerted by the airbag while it is being deployed.

In the various embodiments of the invention, the linear ties used may advantageously have a round or oval section and contain polyaramide and/or polyester fiber, thereby allowing similar operation at all temperatures, in particular in terms of resistance to mechanical stresses.

Each tie advantageously has breaking strength greater than 150 daN, or indeed greater than 300 daN, and preferably greater than 500 daN. The breaking elongation is less than 25%, or indeed less than 15%, and preferably less than 10%.

In the examples shown in the figures, the linear ties are fastened to the back face of the dashboard body and to the back face of the flap, but they may also be fastened to the front face, by being concealed by foam and by the skin constituting the outer covering of the dashboard.

The invention claimed is:

1. A motor vehicle dashboard body provided with an opening closed by a flap, both the opening and the flap being defined by an outline that is generally rectangular, the flap being suitable for opening so as to allow an airbag to be deployed, wherein said motor vehicle dashboard body is further provided with one or more linear ties fastened to one face of the dashboard body and to one face of the flap, in such manner that at least two linear tie segments straddle a lateral portion of the outline that extends longitudinally relative to the vehicle on which the dashboard is to be mounted, said two linear tie segments being slack and crossing over each other at the lateral portion of the outline that they straddle so as to constitute means for limiting the amplitude of opening of the flap.

2. A dashboard body according to claim 1, provided with a linear tie segment that is fastened to the flap in a zone separated from a free edge of the flap by a distance lying in the range 0% of the length of the flap to 40% of said length, and with another linear tie segment that is fastened to the flap in a zone separated from the free edge of the flap by a distance lying in the range 45% of the length of the flap to 75% of said length of the flap.

3. A dashboard body according to claim 2, provided with a linear tie segment fastened to the dashboard body in a zone separated from a portion of the outline that coincides with the hinge via which the flap is hinged to the body by a distance lying in the range 25% of the length of the flap to 50% of said length, and provided with another tie segment that is fastened to the dashboard body in a zone separated from the portion of the outline by a distance lying in the range 60% of the length of the flap to 100% of said length of the flap.

4. A dashboard body according to claim 3, wherein the dashboard body is provided with a back reinforcement to which the linear tie segments are fastened, and wherein said reinforcement has a thickness lying in the range 15% of the length of the flap to 25% of said length of the flap.

5. A dashboard body according to claim 1, provided with fastening tabs overmolded on the linear ties, the linear ties being fastened to the body of the dashboard and/or to the flap via said tabs.

6. A dashboard body according to claim 5, provided with at least one linear tie fastened to the dashboard body or to the flap by means of two tabs overmolded on said linear tie, said two tabs being mutually superposed and fastened to each other, one of said tabs being fastened to the dashboard body or to the flap.

7. A dashboard body according to claim 1, provided with a single linear tie arranged so as to include firstly at least two segments, each of which straddles a lateral portion of the outline so as to retain the flap while it is opening, and secondly segments, each of which straddles the transverse portion of the outline so as to constitute or reinforce a hinge via which the flap is hinged to the dashboard body.

8. A dashboard body according to claim 1, wherein the flap is provided with a trough in which each linear tie is engaged, and wherein one or more ribs extending perpendicularly to the linear tie are provided so as to avoid the flap being torn by the tie during opening.

9. A dashboard body according to claim 1, wherein the ties are made of a material including polyaramide fiber and/or polyester fiber.

10. A dashboard body according to claim 1, wherein the ties have breaking strength greater than 150 daN, and wherein said ties have breaking elongation less than 25%.

* * * * *